United States Patent [19]

Remington et al.

[11] Patent Number: 5,084,971
[45] Date of Patent: Feb. 4, 1992

[54] SAWDUST BLOWER ATTACHMENT FOR POWER SAWS

[76] Inventors: Mark A. Remington, 684 Fransico St., Half Moon Bay, Calif. 94019; Ray K. Abrams, 524 Lakemead Way, Redwood City, Calif. 94062

[21] Appl. No.: 581,296

[22] Filed: Sep. 12, 1990

[51] Int. Cl.⁵ .................. B25F 3/00; B26B 25/00; B23B 51/06
[52] U.S. Cl. ..................... 30/123; 30/123.3; 408/61
[58] Field of Search ............ 30/123, 123.3, 123.5, 30/123.6, 123.7; 83/169; 408/61

[56] References Cited

U.S. PATENT DOCUMENTS

| 4,011,792 | 3/1977 | Davis | 408/61 |
| 4,195,403 | 4/1980 | Gruber | 30/123.3 |
| 4,778,315 | 10/1988 | Duffy et al. | 48/61 |
| 4,782,591 | 11/1988 | DeVito et al. | 30/123.3 |
| 4,870,755 | 10/1989 | Schnizler | 30/123.3 |

*Primary Examiner*—Douglas D. Watts
*Assistant Examiner*—Paul M. Heyrana
*Attorney, Agent, or Firm*—Flehr, Hohbach, Test, Albritton & Herbert

[57] ABSTRACT

Sawdust created by a power saw's cutting action is blown away from the line of cut by streams of air carried by conduits extending from a plenum which receives air from the fan on the saw motor's rotor.

4 Claims, 2 Drawing Sheets

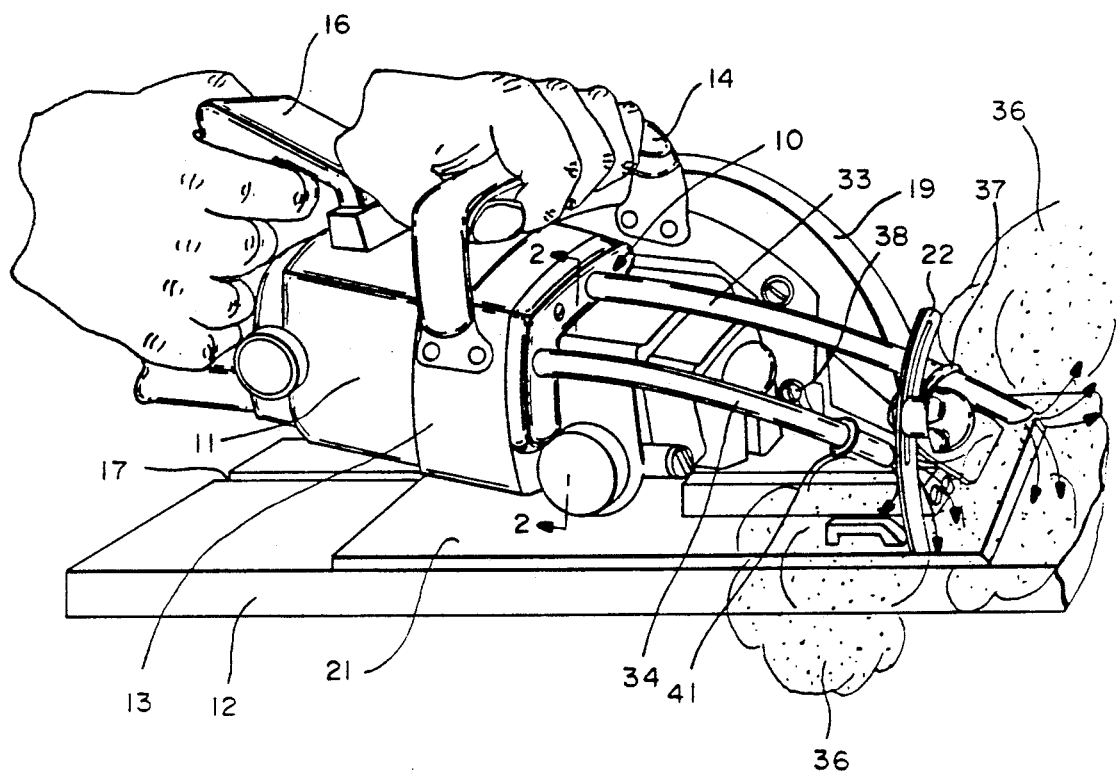
FIG.—1
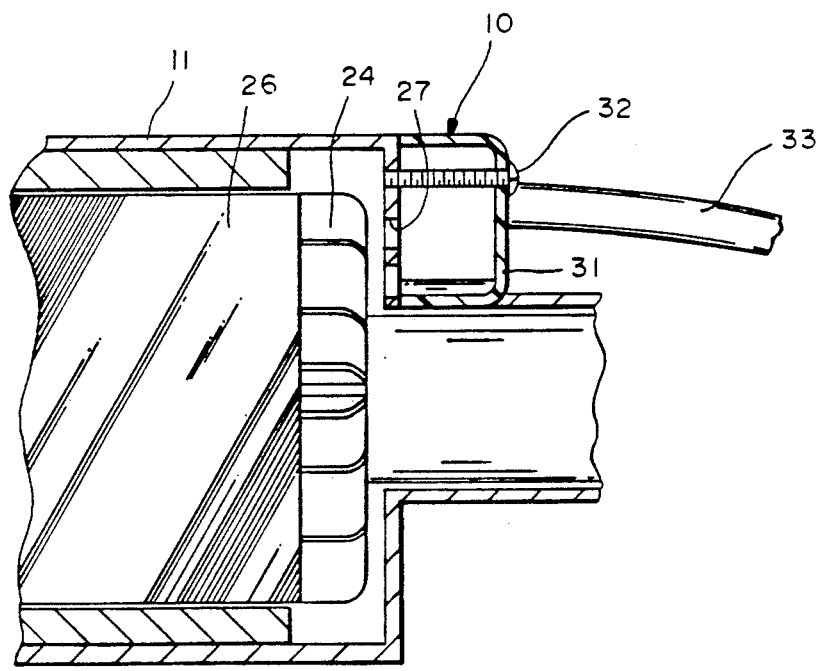
FIG.—2

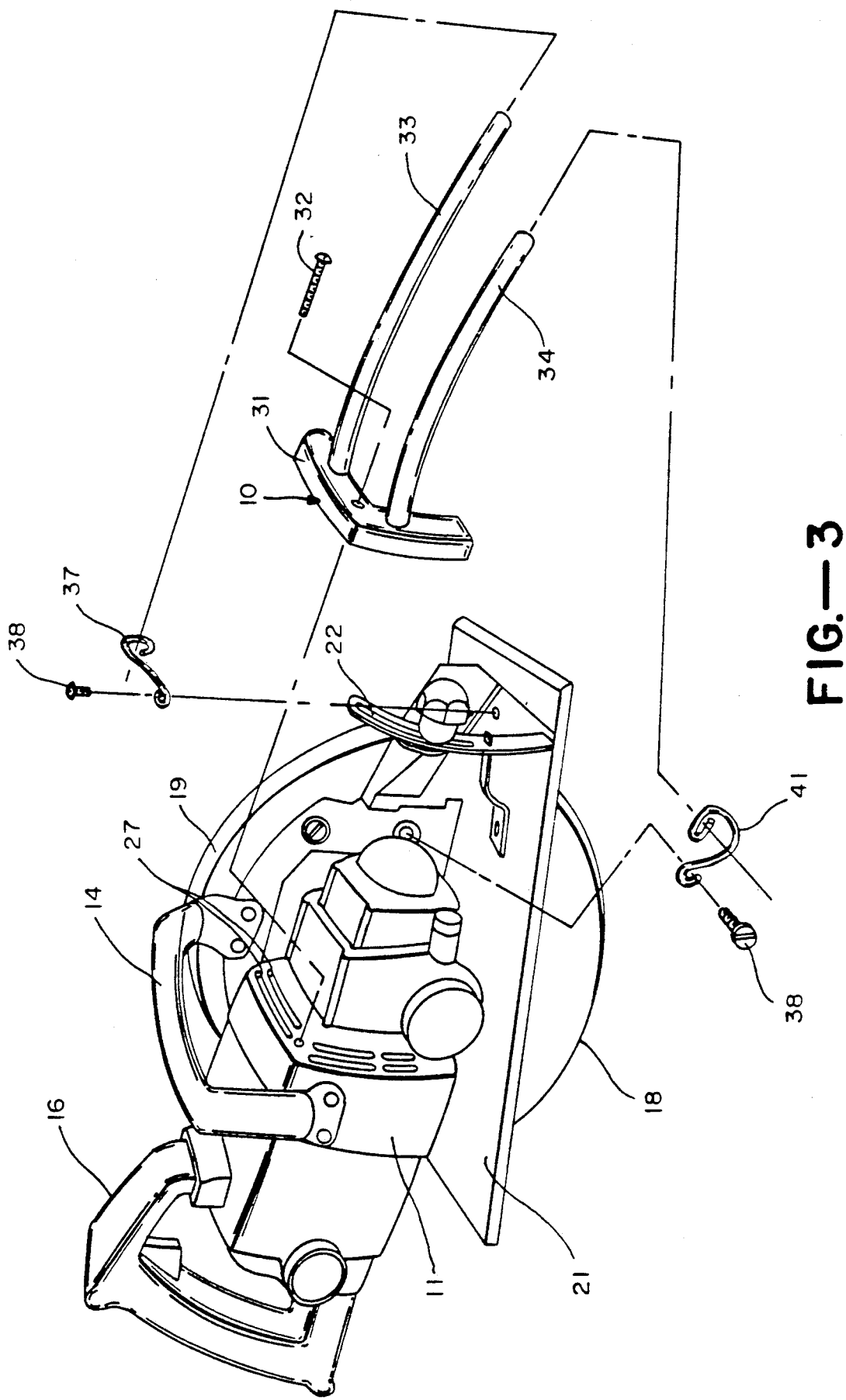
FIG.—3

5,084,971

SAWDUST BLOWER ATTACHMENT FOR POWER SAWS

BACKGROUND OF THE INVENTION

This invention relates to power saws and has particular reference to means for deflecting sawdust away from the operator and away from the line of cut which becomes and continues to be readily visible to the operator.

DESCRIPTION OF THE PRIOR ART

Power saws configured as hand held or arbor mounted, are either pneumatically or electric powered, and are among the most common hand tools. This equipment is widely used by professional carpenters as well as non-professional "do-it-yourselfers". When cutting materials such as wood, wallboard or fiberboard and the like, the saw operator finds frequently that the line of cut is obliterated by the accumulation of sawdust generated in the cutting action of the circular blade. A number of approaches have been made to deal with sawdust generated by a circular saw, some innovators preferring to capture the sawdust and others to deflecting the sawdust away from the cut.

More specifically, U.S. Pat. No. 4,675,999 issued to Ito et. al., June 30, 1987, provides for a dust collection box and uses air generated from the rotating blade operating in a channel so that air movement from the blade will carry the dust into the collection box. U.S. Pat. No. 3,662,796 to Batistelli of May 16, 1972, shows a sawdust deflector mounted as an attachment to a portable power saw at the blade guard, the attachment being transparent so as to permit the operator to directly view the cutting action of the saw blade. The Earle, et. al. U.S. Pat. No. 3,882,598 of May 13, 1975, shows the collection of sawdust at two locations along the blade perimeter path through the use of suction to prevent sawdust from escaping into the ambient surroundings. One collection position is at or near the cutting line, and the other collection position is at a position remote therefrom. A suction or vacuum was applied at two locations in U.S. Pat. No. 4,241,505 of Dec. 30, 1980 to Bodycombs, Jr. et. al. There, a dust shroud over the blade permits suction to move the dust away from the blade and into a collection chamber.

As will be seen below, the applicant provides for the removing of the sawdust from the line of cut, however in a very reliable and very uncomplicated and economical manner, by taking advantage of capabilities inherent in the pneumatic or electric motor of a saw.

SUMMARY OF THE INVENTION

An object of the invention is to provide a reliable, uncomplicated and economical assembly mountable on the housing of a power saw for dispersing sawdust away from the line of cut.

Another object of the invention is to provide an accessory easy to mount on a hand held power saw, which makes efficient use of the available motor air cooling without over burdening the motor, or requiring an ancillary air generating means for dispersing sawdust from the line of cut Another object of the invention is to provide sawdust dispersion or blowing means which does not obscure the view of the line of cut and which may be readily adjusted or aimed for the most efficient sawdust dispersion.

In summary, the invention resides in an approvement mountable upon a power saw casing which contains an air exhaust outlet from the motor therein, the accessory comprising a dispersion means mountable to the casing and including an air plenum conformable to the casing along the margins surrounding the housing air exhaust, and configured to receive substantially all of the air from the saw motor through such air exhaust. At least one conduit is mounted on the plenum for receiving air therefrom and extending to a distal end positioned adjacent to the saw blade near the line of cut. Fastener means secured the plenum to the housing and means are provided for the positioning of the conduit with respect the saw housing so as to hold the conduit in the selected position for air discharge so that air flowing from the saw motor may be conveyed for blowing sawdust away from the cutting line of the work being sawed.

BRIEF DESCRIPTION OF THE DRAWINGS

FIG. 1 is a perspective view of a circular saw engaged in cutting work and having mounted thereon a sawdust dispersion device of the present invention.

FIG. 2 is an enlarged sectional view in the direction of the arrows 2—2 of FIG. 1.

FIG. 3 is a perspective exploded view of the saw and the sawdust dispersion attachment of the present invention.

DESCRIPTION OF THE PREFERRED EMBODIMENT

The sawdust blower attachment 10 is shown in the drawings and referring to FIG. 1, is shown operatively mounted on a portable, powered hand saw 11 depicted cutting a piece of flat stock work 12 which may be either wood, particle board, wallboard or the like. The saw 11 includes a housing 13 upon which is mounted a forward cross-handle or grip 14 and the trigger-handle or grip 16. Customarily, the operator engages the grips 14, 16 as shown in FIG. 1, to urge the saw 11 through the work by guiding it along the line of cut 17.

Well understood features of the saw are the pivotally movable bottom blade guard (FIG. 3) 18 and the top blade guard 19 which is fixedly secure with respect to the housing 11. It will be understood that the circular blade of the saw 11 rotates in a zone of safely defined by the guards 18 and 19. Supporting the saw on the work 12 is a base plate 21 shown arranged perpendicular to the guards 18 and 19 and which may be moved for angle cuts through adjustment of the guide sector 22.

To drive the saw, the housing 11 is provided with either an electric or pneumatic motor which frequently is coupled to a right angle drive, step-down transmission. The output shaft of the transmission drives the circular saw blade. The foregoing parts are not shown but these are well known in the field of powered saws. For purposes of cooling the electric motor, a fan 24 is customarily arranged in the housing and mounted on the rotatable armature 26 of the motor FIG. 2. Air is drawn over the motor into the housing and exits the housing through the openings 27, FIG. 3. By having a constant outward flow of air moving in the direction of cut, a minimum amount of dust is ingested into the motor compartment. The sawdust blower attachment 10 is configured to be mounted in a substantially air tight manner to the housing 11 so as to completely cover the openings 27 thereby to receive all of the coolant air generated by the motor armature fan 24.

More specifically, the unit 10 includes an L-shaped plenum member 31 closed at the end of each leg and is equipped for receiving a fastener 32 for fixedly mounting the blower unit 10 to the housing 11. In cross section, the plenum 31 is channel shaped as shown in FIG. 2. Two conduits 33 and 34 are united to the plenum air tight arrangement for conveying air therefrom to a desired selected location ahead of the blade and focused on the work. As may be seen from the drawings, the conduit 33 is mounted to the plenum 31 along one leg of the L-shaped plenum and the conduit 34 is similarly mounted on the other leg. The distal end of the conduit 33 projects a further distance along the work than the distal end of the conduit 34 so that two different zones of air distributions are provided as illustrated in FIG. 1 for dispersion of the sawdust 36 away from the line of cut.

The distal end of the conduit 33 is arranged in a position selected by the operator and maintained in that position by a keeper 37 which is mounted to the saw frame by a fastener 38. Being that the keeper 37 is made from a wire-like or easily deformable material, the keeper may be bent either up or down or forward or backward so as to position the conduit 33 in a desired selected position. Similarly, a keeper 41 holds the shorter conduit 34 in the desired selected position.

In operation, the sawdust dispersion attachment 10 is first mounted to the saw 11 by removing a fastener from the housing 11 and securing the unit 10 in place with the fastener 32. The plenum is so formed with closed ends and configured to engage the housing and form a substantially air tight seal therewith in the zone containing the air discharge openings 27. The keepers 37 and 41 are mounted to the saw frame by the fasteners 38 and the conduits 33 and 34 respectively are extended into the keepers so that an air discharge position is established for each of the conduits 33 and 34. Upon starting the saw, the fan 24 carried by the rotatable motor armature, will generate air flow through the housing 11 and into the plenum 31 which achieves a slightly positive air pressure so as to cause air to flow through the conduits 33 and 34 for blowing the sawdust away from the cutting line.

It has found that the present invention forms an efficient and economical means of clearing sawdust so that the operator may view the cutting line.

There has been illustrated here the sawdust blower attachment operatively associated with a circular power saw sold under the trademark 'SKILL'. However, electrically or pneumatically powered saws generally include an air discharge and it is intended that the plenum may be so configured to fit closely to such housings.

The invention is usefully mounted on non-rotary saws such as continuous blade bond saws as well as reciprocating saber saws or stationary cutoff saws.

Thus, as the present invention has been described with reference to the specific embodiment with relation to a "SKILL" saw, changes and modification to the above embodiment may be made and be within the scope claimed for the invention as set out in the claims below. The above specification should therefore be interpreted in a descriptive and not in a limiting sense.

What is claimed is:

1. In a power saw having a housing encasing an electric motor with provisions for circulating air to cool the motor including an air exhaust from the housing, the motor driving a saw blade for cutting along a line, the improvement comprising a sawdust dispersion means mountable upon said housing, said dispersion means including an air plenum conformable to the housing along the margins surrounding such housing air exhaust and configured to receive substantially all of the air from the saw motor through such air exhaust, at least one conduit on said sawdust dispersion means connected to said plenum for receiving air therefrom, said conduit having smooth and continuous sidewalls extending from said plenum to an unobstructed distal end positioned adjacent to one side of the saw blade serving to provide an unobstructed flow of air from the plenum to proximate the cutting line when the saw blade engages the work, fastener means for mounting said plenum to said housing, and conduit positioning means equipped for mounting upon the saw housing, said conduit positioning means encircling said conduit and serving to locate the distal end of the conduit in a preselected position extending from the saw housing to discharge air adjacent to one side of the cutting line of the work being sawed.

2. The apparatus of claim 1, wherein the saw is a rotary hand held saw and wherein a plurality of said air conducting conduits are connected to the plenum, and wherein said conduit positioning means is configured for positioning one of the conduits so that the distal end thereof is spaced closely adjacent to the one side of the saw blade and second conduit positioning means are provided for positioning another of the conduits so that the distal end thereof is positioned forward of the cutting action of the saw blade.

3. The apparatus of claim 2, wherein said air conducting conduits are of unequal length.

4. The apparatus of claim 1, wherein said plenum is generally "L" shaped, having two arms and at least one conduit is mounted on one such arm.

* * * * *